(12) United States Patent
Liao

(10) Patent No.: US 6,378,797 B1
(45) Date of Patent: Apr. 30, 2002

(54) STRUCTURE OF WIRE WINDING BOX

(76) Inventor: Sheng Hsin Liao, No.10, Alley 38, Lane 229, San Chun St., Shu Lin, Taipei Hsien (TW)

( * ) Notice: Subject to any disclaimer, the term of this patent is extended or adjusted under 35 U.S.C. 154(b) by 0 days.

(21) Appl. No.: 09/573,668

(22) Filed: May 19, 2000

(30) Foreign Application Priority Data

Apr. 19, 2000 (TW) ................................ 87215267A01 U

(51) Int. Cl.[7] .............................................. B65H 75/48
(52) U.S. Cl. ................................ 242/378.1; 242/385.4; 191/12.2 R
(58) Field of Search ........................... 242/378.1, 378.2, 242/378.3, 385.4, 388.1, 373; 191/12.2 R, 12.4

(56) References Cited

U.S. PATENT DOCUMENTS

| | | | | |
|---|---|---|---|---|
| 4,901,938 A | * | 2/1990 | Cantley et al. | 242/378.1 |
| 5,354,011 A | * | 10/1994 | Rozon | 242/378.1 |
| 5,588,626 A | * | 12/1996 | Yang | 242/378.1 |
| 6,079,657 A | * | 6/2000 | Hwang | 242/388.1 |
| 6,199,784 B1 | * | 3/2001 | Wang et al. | 242/385.4 |

* cited by examiner

Primary Examiner—John M. Jillions
(74) Attorney, Agent, or Firm—Rosenberg, Klein & Lee

(57) ABSTRACT

The present invention proposes an improved structure of a wire winding box, which comprises a housing, a rotary disk, a communication cable, a spiral spring, and a locking button. The housing comprises a top cap and a bottom cap. The rotary disk is pivotally installed in a rotary disk tank in the housing. A shaft bushing is installed or integrally formed on one disk surface of the rotary disk for the penetrating and winding of the communication cable. A ring is installed on another disk surface of the rotary disk to be hooked by the spiral spring received in a receiving tank beside the rotary disk tank to provide uniform rewinding force for the rotary disk with respect to the communication cable. The locking button is worked by a resilient element to let a push part thereof protrude out of the housing. A bump is formed on the locking button and extends to the rotation path of a slanting retaining block preset on the rotary disk to stop the retaining block timely to lock the rotary disk. Easier production and assembly of the wire winding box can thus be achieved. More convenient use can also be attained.

6 Claims, 9 Drawing Sheets

STRUCTURE OF WIRE WINDING BOX

FIELD OF THE INVENTION

The present invention relates to a wire winding box and, more particularly, to a miniature wire winding box, which can be used in wired-communication apparatuses to provide free pull-out of a communication cable with a proper length, and can rewind the cable automatically to avoid the improper winding of the cable. Moreover, the present invention has a simpler structure.

BACKGROUND OF THE INVENTION

When using communication apparatuses such as computers, modems, telephones, or facsimile machines, communication cables with proper lengths are needed to achieve electric connection. To prevent excess communication cables from improper winding or too short communication cables from not meeting practical requirements, wire winding boxes have been used. Most wire winding boxes comprise mainly a shell, a rotary disk, a spiral spring, and a communication cable. The spiral spring is fixedly connected to the rotary disk so that the communication cable wound around the rotary disk can be rewound because of the resilient potential of the spiral spring. Because the communication cable must keep electric connection during the rotation process when pulled out or rewound, different conductive devices are installed in part of the winding boxes. For instance, a plurality of concentric conductive rings having different radiuses are installed on the disk surface of the rotary disk. A plurality of conductive elements such as resilient plates or steel beads are installed at corresponding positions on another rotary disk or the shell to match to the conductive rings. During the rotation process of the rotary disk, the communication cable can thus retain steady electric connection. However, because the conductive devices comprises a large number of small conductive elements such as the conductive rings, the conductive resilient plates, or the steel beads, the assembly process will be time-consuming and laborsome. Especially, bad contact may easily arise from vibration or abrasion so that long term use can not be achieved. Besides, due to improper installing ways and positions of the spiral spring, it will be unevenly effected when the communication cable is pulled out. Therefore, the volume of the wire winding box will be enlarged so as to deteriorate its portability and convenience. Moreover, a conventional wire winding box will present a tightening state because of the resilient force of the spiral spring when the communication cable is pulled out so that a proper length can not be kept, resulting in a great trouble to the user.

SUMMARY AND OBJECTS OF THE PRESENT INVENTION

One object of the present invention is to provide an improved structure of a wire winding box, which has a simpler structure and can be produced and assembled more easily. Moreover, more durable use can be achieved. To achieve the above object, the present invention comprises a housing, a rotary disk, a communication cable, a spiral spring, and a locking button. The rotary disk is pivotally installed in a rotary disk tank in the housing. A shaft bushing is installed on one disk surface of the rotary disk for the penetrating and winding of the communication cable. A ring is installed on another disk surface of the rotary disk to be hooked and wound by the spiral spring received in a receiving tank beside the rotary disk tank to provide uniform rewinding force for the rotary disk with respect to the communication cable.

Another object of the present invention is to provide an improved structure of a wire winding box, wherein a communication cable of a proper length can be pulled out and fixed so that improper winding of the communication cable can be prevented. Moreover, tightening state of the communication cable can be avoided so that use of a communication apparatus will not be influenced.

To achieve the above object, at least a slanting retaining block is installed on one disk surface of the rotary disk. An integrally formed push part protruding out of the housing and worked by a resilient element is installed beside the rotary disk tank adjacent to the rotary disk. A bump is formed on the locking button and extends to the rotation path of the retaining block to secure the retaining block timely to lock the rotary disk.

The various objects and advantages of the present invention will be more readily understood from the following detailed description when read in conjunction with the appended drawings, in which:

DETAILED DESCRIPTION OF PREFERRED EMBODIMENT

Figure 1:
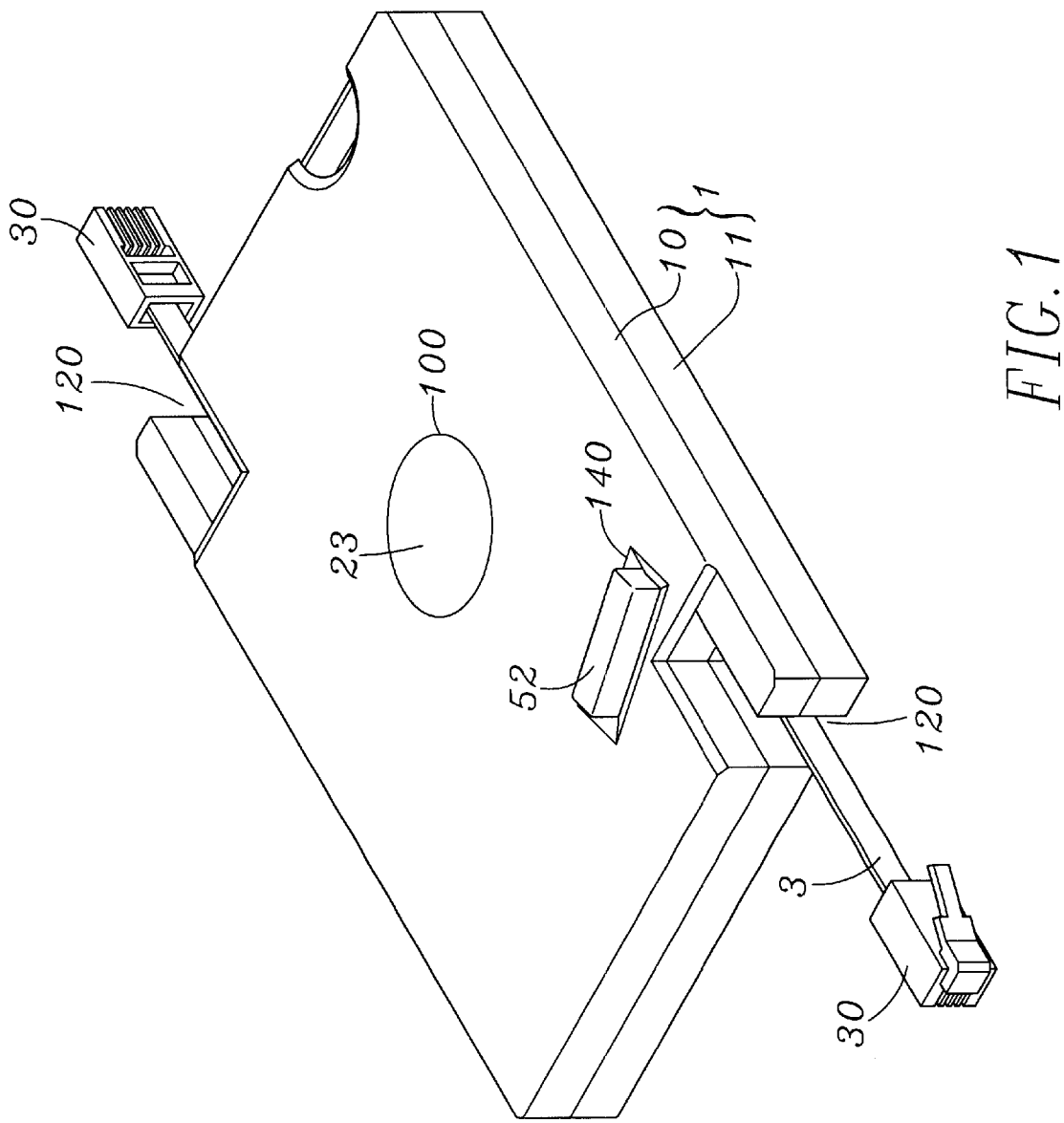
FIG. 1 is a perspective view according to a first embodiment of the present invention.
Figure 2:
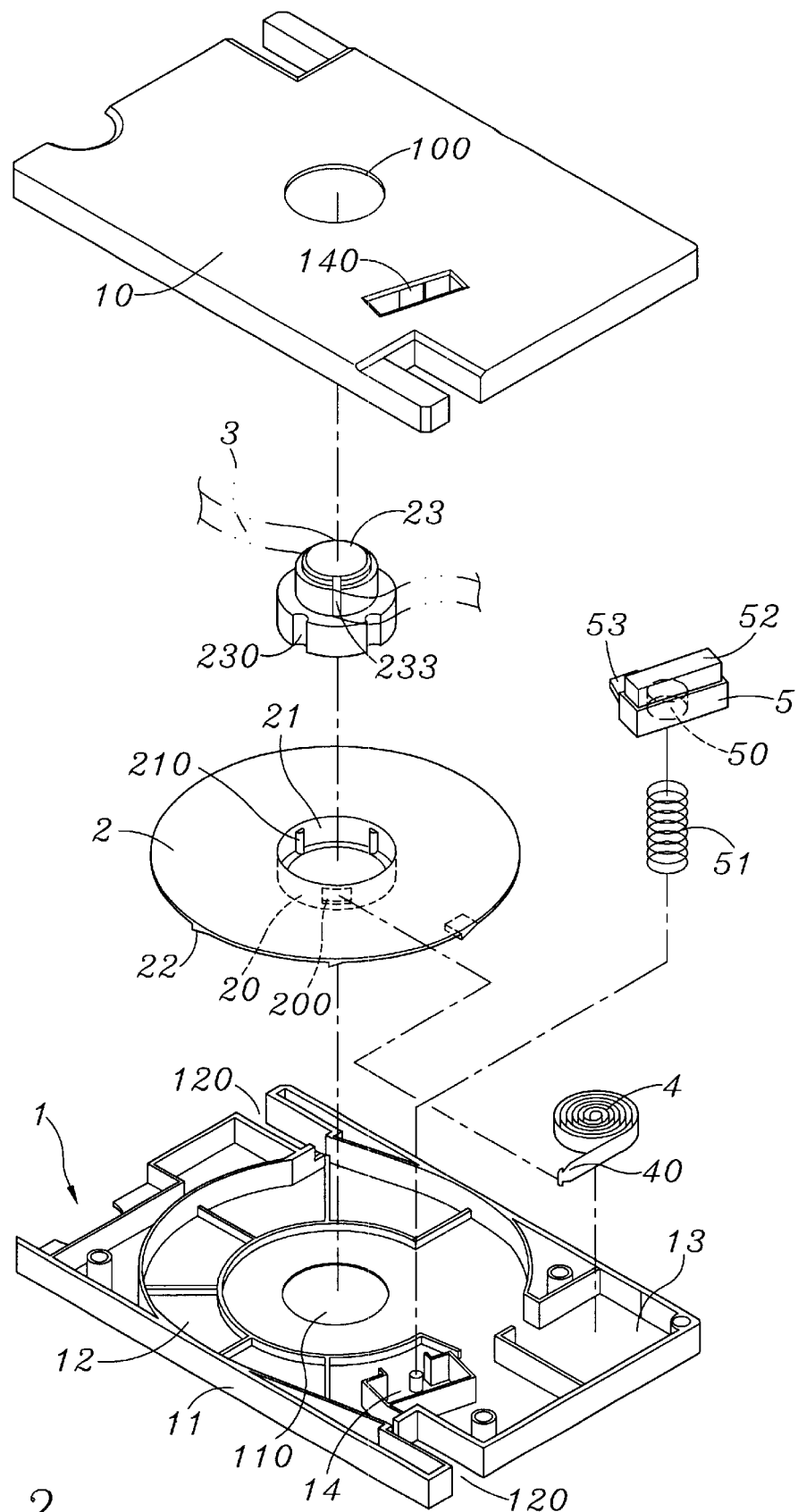
FIG. 2 is an exploded perspective view according to a first embodiment of the present invention.

As shown in FIGS. 1 and 2, a wire winding box of the present invention comprises a housing 1, a rotary disk 2, a communication cable 3, a spiral spring 4, and a locking button 5.

The housing 1 comprises a top cap 10 and a bottom cap 11 to form a rotary disk tank 12, a receiving tank 13, a fixing tank 14 having a through hole 140, and two cable outlets 120 connected to the rotary disk tank 12. Pivotal holes 100 and 110 are disposed at the corresponding centers of the top cap 10 and the bottom cap 11, respectively.

Figure 3A:
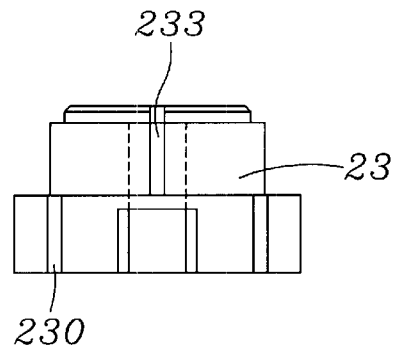
FIG. 3A is a side view of the shaft bushing according to a first embodiment of the present invention.
Figure 3B:
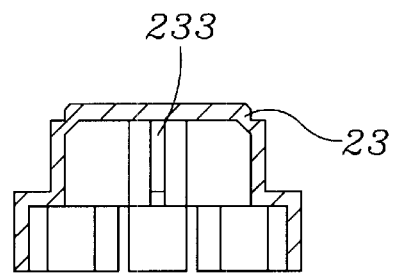
FIG. 3B is a cross-sectional side view of the shaft bushing according to a first embodiment of the present invention.
Figure 3C:
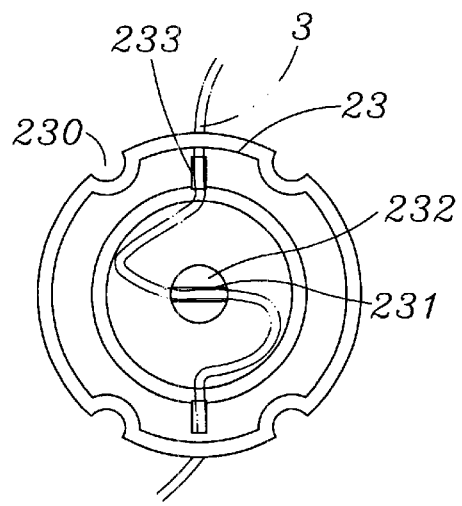
FIG. 3C is a bottom view of the shaft bushing according to a first embodiment of the present invention.

The rotary disk 2 is rotatably received in the rotary disk tank 12. A ring 20 having a hook groove 200 and a circular groove 21 having at least a positioning bar 210 at the groove wall thereof are installed at the center of the rotary disk. A shaft bushing having the same number of positioning grooves as that of the positioning bars installed around the periphery thereof can thus be sheathed and positioned in the circular groove 21. As shown in FIGS. 3A to 3C, the bottom of the shaft bushing 23 is hollow. A shaft 232 having a cut slot 231 is installed at the center thereof and slots 233 perpendicular to or not in line with the cut slot 231 are disposed at the two sides thereof. Besides, at least a slanting retaining block 22 is installed at the position at the same distance from the center on one disk surface of the rotary disk 2.

Figure 4:
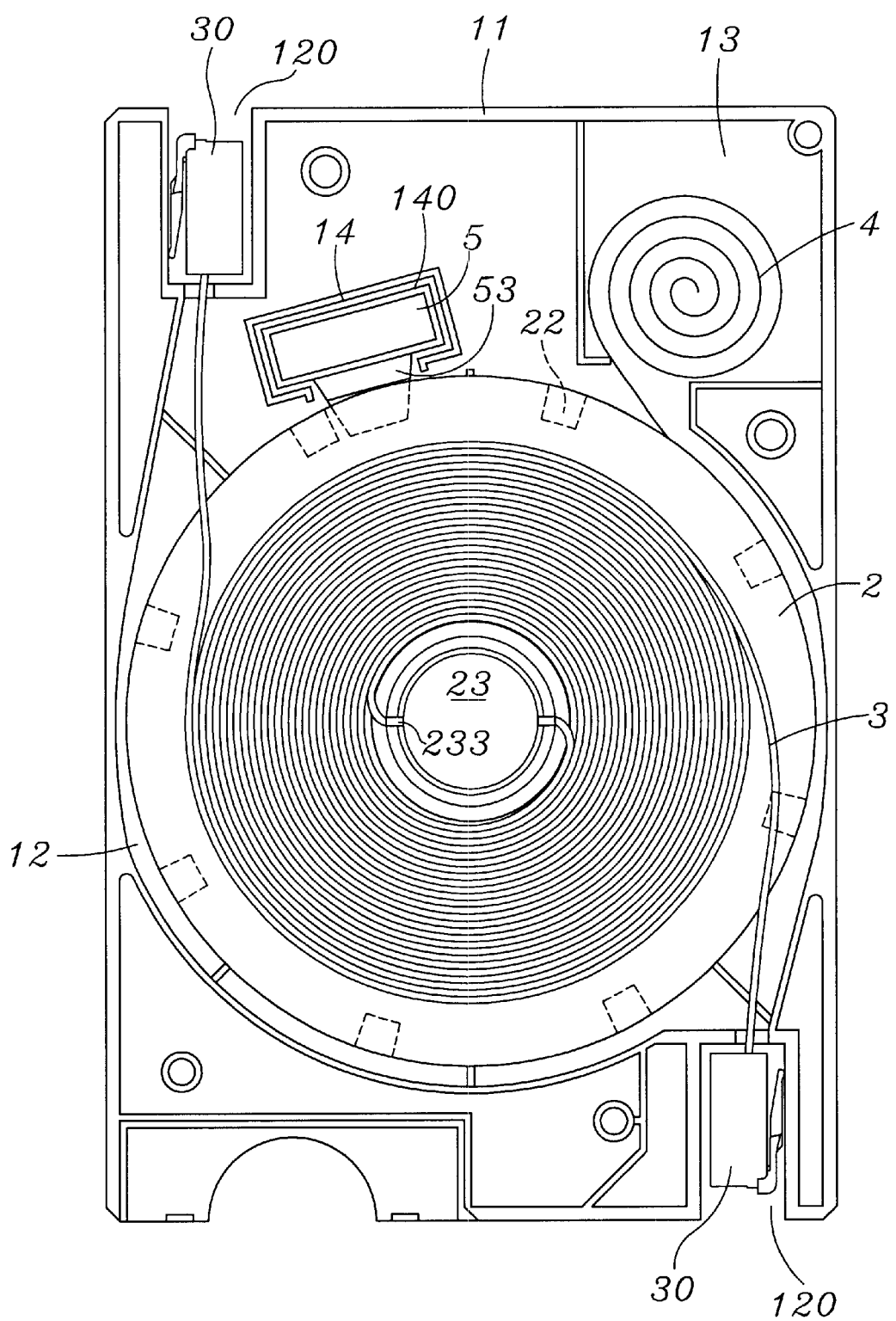
FIG. 4 is a top plane view showing the assembled structure when the top cap is removed according to a first embodiment of the present invention.

As shown in FIGS. 2 and 3C, the middle section of the communication cable 3 penetrates through the slots 233 and the cut slot 231 perpendicular to each other to be positioned therein so that the communication cable 3 can be wound around the shaft bushing 23 when the rotary disk rotates. As shown in FIGS. 1 and 4, a plug 30 protruding out of the cable outlet 120 is connected to each end of the communication cable 3.

The spiral spring 4 is received in the receiving tank 13. The outer hook end 40 thereof is hooked in the hook groove 200 of the ring 20 to hold the rotary disk 2 so that it can be wound around the ring 20 when the rotary disk 2 rotates.

The locking button 5 having a groove 50 to receive a resilient element 51 is installed in the fixing tank 14. A push part formed thereon protrudes out of the through hole 140. The locking button 5 extends to the rotation path of the retaining block 22 of the rotary disk 2 to form a bump 53 so as to stop the retaining block 22 timely to lock the rotary disk 2 when the rotary disk 2 rotates.

Figure 5:
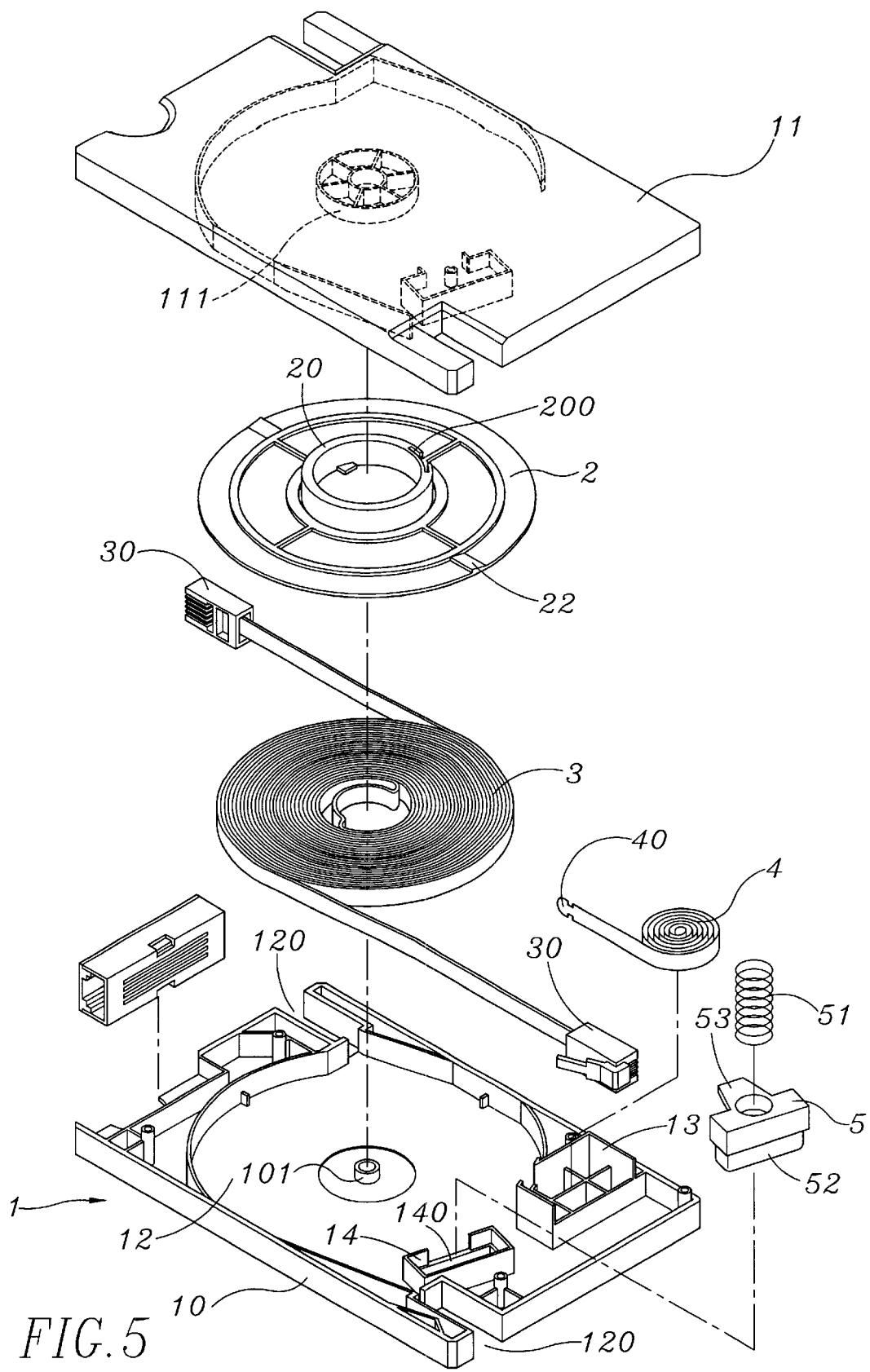
FIG. 5 is an exploded perspective view according to a second embodiment of the present invention.
Figure 6:
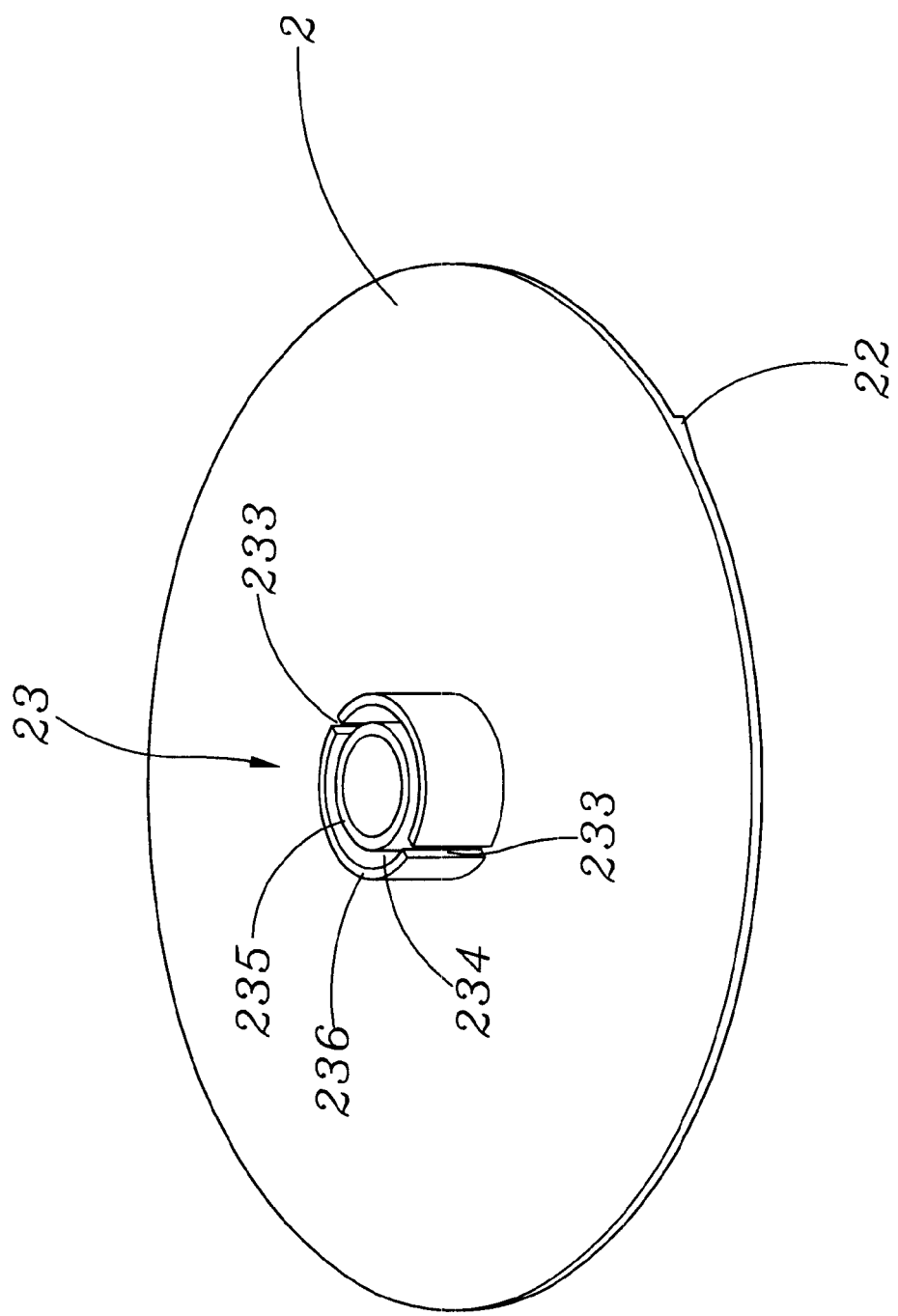
FIG. 6 is perspective view of the rotary disk according to a second embodiment of the present invention.
Figure 7:
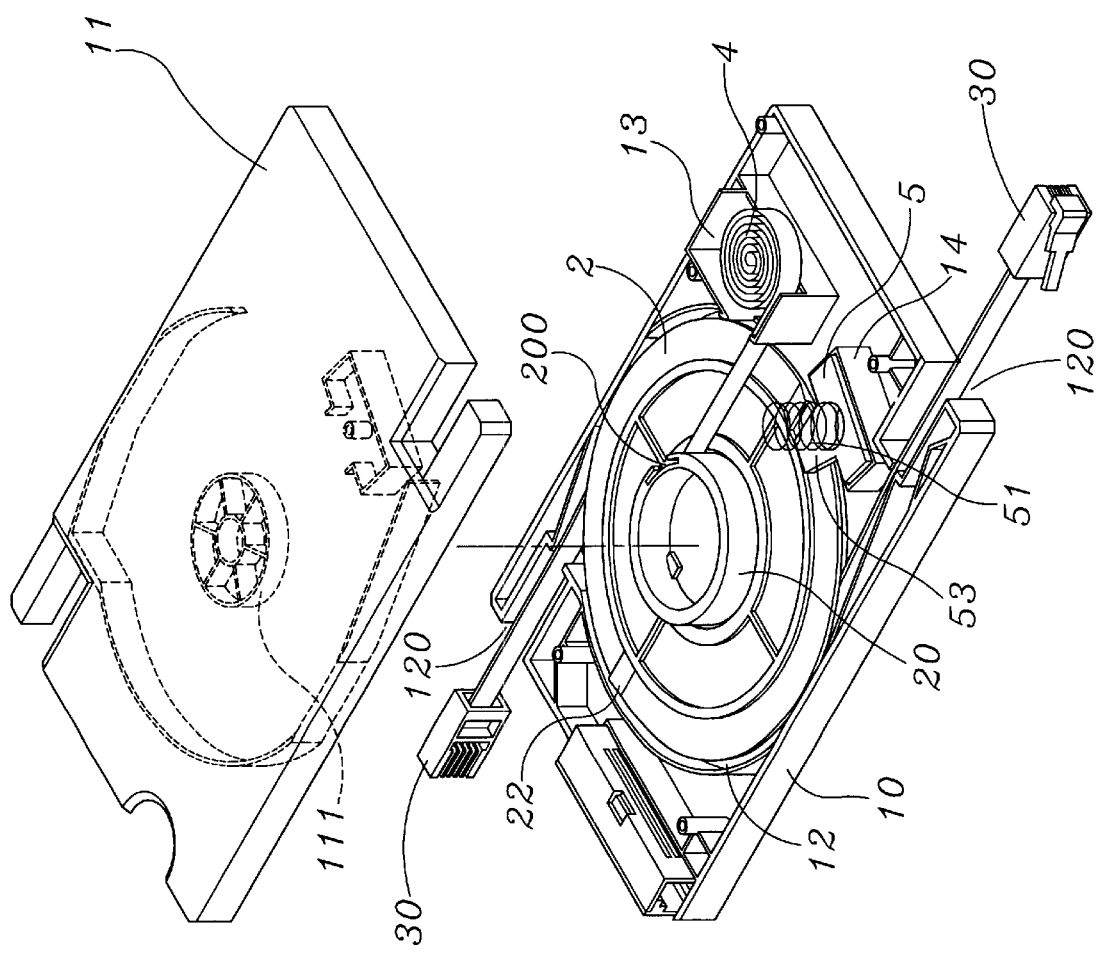
FIG. 7 is a perspective view showing the partly assembled structure according to a second embodiment of the present invention.
Figure 8:
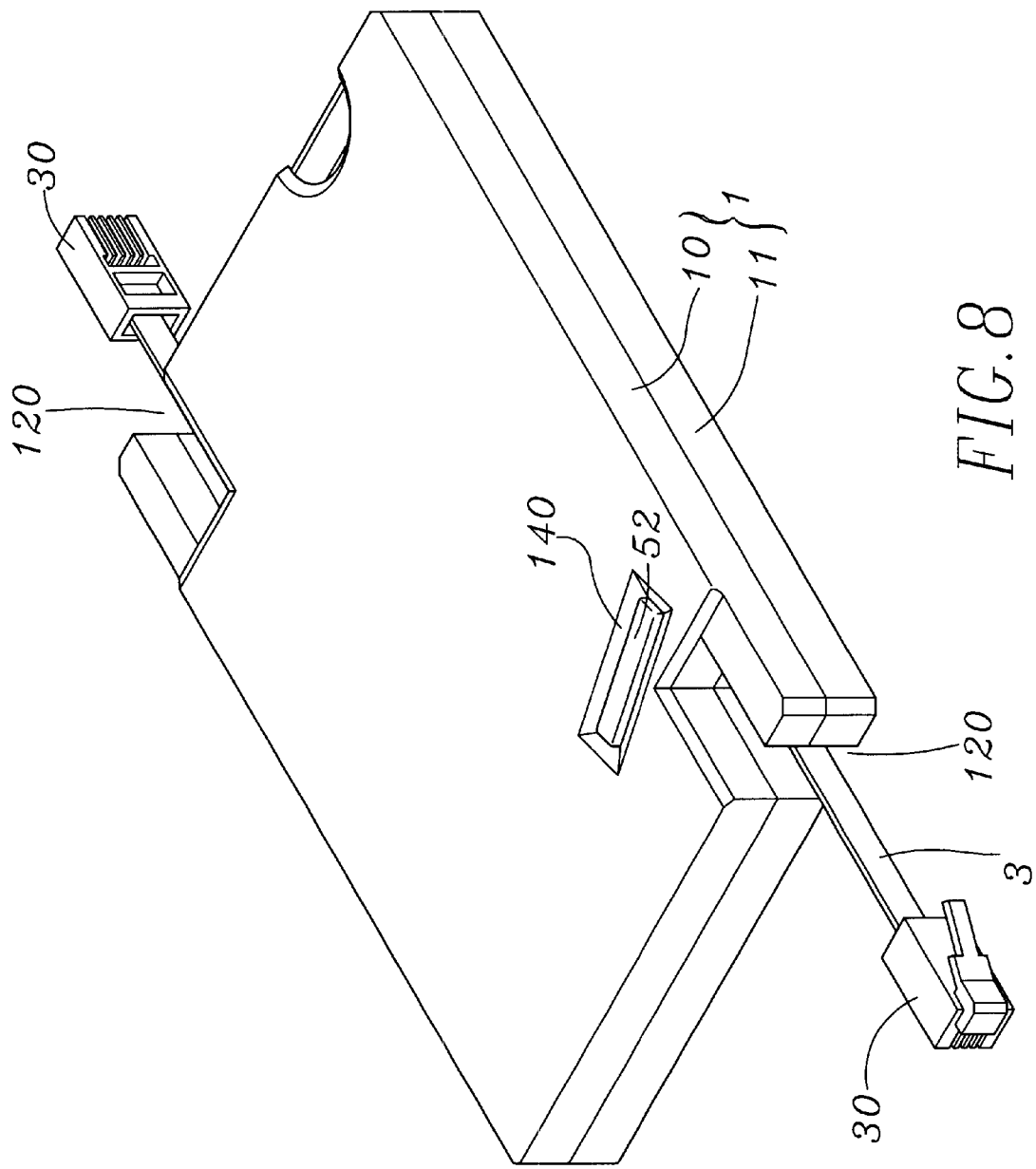
FIG. 8 is a perspective view according to a second embodiment of the present invention.
Figure 9:
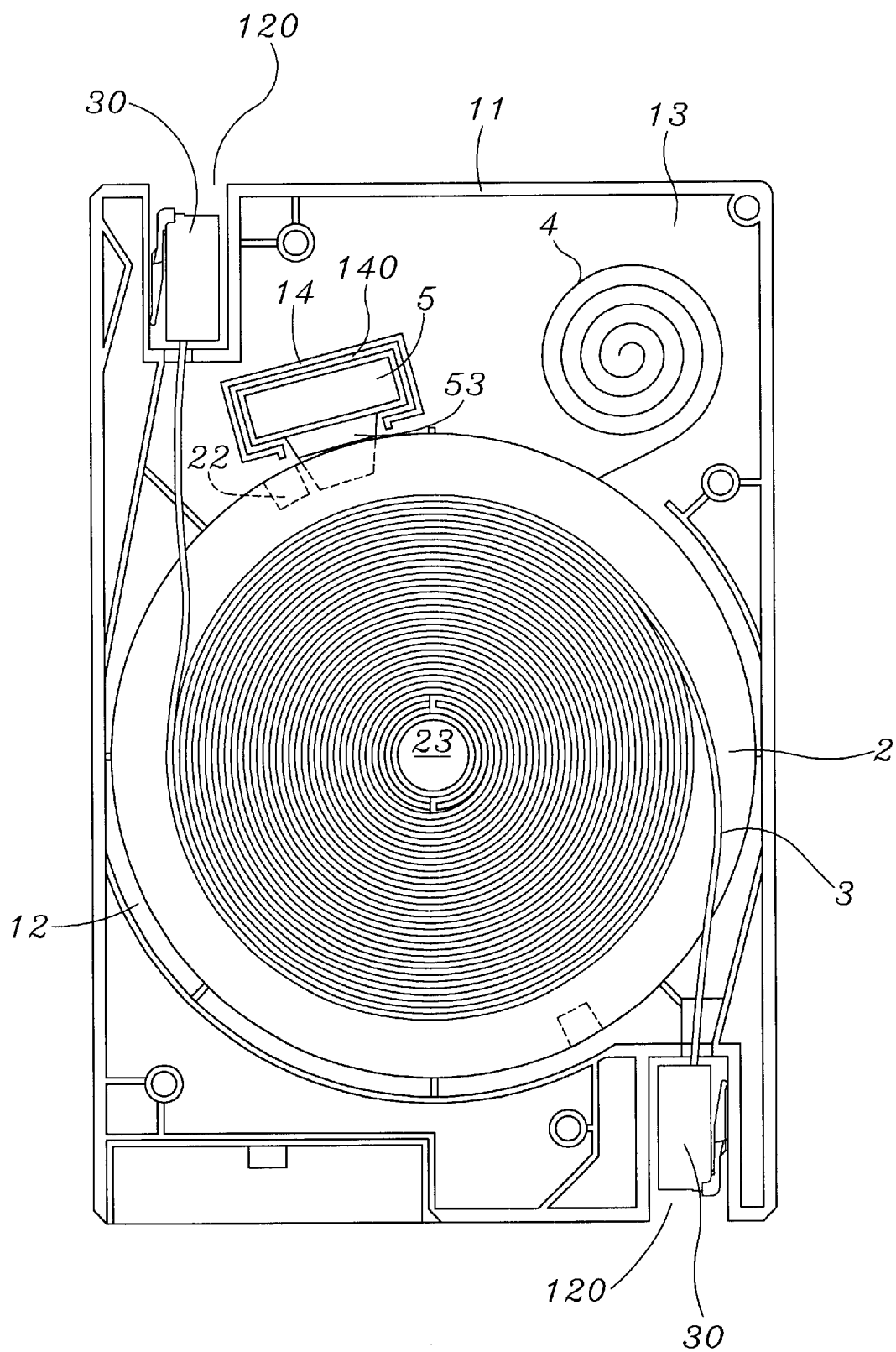
FIG. 9 is a top plane view showing the assembled structure when the top cap is removed according to a second embodiment of the present invention.

The present invention can also adopt the structure of the second embodiment shown in FIG. 5. As shown in FIG. 7, the structure and operation of the second embodiment only differ from those of the first embodiment in the producing way of the shaft bushing 23 of the rotary disk 2, the penetrating way of the communication cable 4 through the shaft bushing 23, and the pivotal installing way of the rotary disk 2. Speaking in detail, as shown in FIG. 6, the shaft bushing 23 is integrally formed on the rotary disk 2 and comprises an inner ring 235 and an outer ring 236 spaced by an annular groove 234. Slots 233 are cut on both sides of the outer ring 236. The middle section of the communication cable 3 can be mounted in the slots 233, fixed in the annular groove 234, and then be wound around the outer ring 236 when the rotary disk 2 rotates, as shown in FIG. 9. To match to the forming way of the shaft bushing 23, the top cap 10 has no pivotal hole 100 as in the first embodiment but has a shaft 101. The bottom cap 11 has no pivotal hole 110 as in the first embodiment but has a pivotal ring 111 to be pivotally sheathed in the ring 20. Easier production and assembly of the rotary disk 2 can thus be achieved. As shown in FIG. 8, delicacy of the assembled wire winding box will also be achieved.

Under the push of the resilient element 51, the bump 52 of the locking button 5 will interfere on the rotation path of the retaining block 22 of the rotary disk 2. When the communication cable is pulled out to drive the rotary disk 2 to rotate, the retaining block 22 will smoothly push off the bump 53 via the bevel thereof so that the rotary disk 2 can rotate continually to facilitate the pull-out of the communication cable 3. When the communication cable with a predetermined length is pulled out and then freed so that the rotary disk 2 rewinds due to the resilient force generated by the spiral spring 4, the bump 53 will stop the retaining block 22 to limit the rotation of the rotary disk 2. The communication cable 3 will not be further rewound so that the communication cable 3 with a predetermined length can be retained. When the user presses the push part 52 of the locking button 5 to let the bump 52 leave from the retaining block 22, the rotary disk 2 will rotate to rewind the communication cable 3 quickly.

Through the above simple structure and proper arrangement, easy and quick assembly of the wire winding box can be achieved. The wire winding box not only has the rewinding function of the communication cable 3, but also has the function that the communication cable 3 with a predetermined length can be pulled out and fixed timely. Moreover, because the communication cable is an individual cable and penetrates through the shaft bushing 23 of the rotary disk 2 via a special way, complicated conductive structure for connecting two cables are not required as in the wire winding boxes in prior art. Therefore, bad contact due to vibration or abrasion will not arise.

Although the present invention has been described with reference to the preferred embodiments thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

I claim:

1. An improved structure of a wire winding box, comprising:

a housing comprising a top cap and a bottom cap to form a rotary disk tank, a receiving tank, a fixing tank having a through hole, and two cable outlets connected to said rotary disk tank, a rotary disk rotatably received in said rotary disk tank, a circular groove having positioning bars on its groove wall being formed at a center of one disk surface of said rotary disk while a ring having a hook groove being formed at a center of another disk surface of said rotary disk so that a shaft bushing having positioning grooves around the periphery thereof can be positioned in said ring, slots being formed at two opposite sides of said shaft bushing, at least a slanting retaining block being installed at a predetermined distance from the center of and on the same disk surface of said rotary disk as said ring, a communication cable whose middle section penetrating through said slots to be positioned therein, a plug protruding out of said cable outlets being connected on each end of said communication cable, a spiral spring received in said receiving tank and hooked in said hook groove of said ring via the outer hook end thereof so as to be wound around said ring when said rotary disk rotates, a locking button received in said fixing tank and pushed by a resilient element so that a push part installed thereon protrudes out of said through hole of said housing, a bump being formed on said locking button and extending to the rotation path of said retaining block of said rotary disk, whereby said rotary disk will be pushed off by the bevel of said slanting retaining block when said communication cable is pulled out, and said locking button will stop said retaining block to lock said rotary disk when said communication cable is rewound.

2. The improved structure of a wire winding box of claim 1, wherein the bottom of said shaft bushing of said rotary disk is hollow and has a shaft, and a cut slot not in line with said slot is formed on said shaft so that said communication cable penetrating through said slot can further penetrate through said cut slot to be positioned therein.

3. The improved structure of a wire winding box of claim 1, wherein pivotal holes are respectively formed at positions on said top cap and said bottom cap of said housing corresponding to said shaft bushing and said ring of said rotary disk so that they can be pivotally installed thereon.

4. An improved structure of a wire winding box, comprising:
- a housing comprising a top cap and a bottom cap to form a rotary disk tank, a receiving tank, a fixing tank having a through hole, and two cable outlets connected to said rotary disk tank,
- a rotary disk rotatably received in said rotary disk tank, a shaft bushing having two opposite slots being integrally formed at a center of one disk surface of said rotary disk while a ring having a hook groove being integrally formed at a center of another disk surface of said rotary disk, at least a slanting retaining block being installed at a predetermined distance from the center of and on the same disk surface of said rotary disk as said ring,
- a communication cable whose middle section penetrating through said slots to be positioned therein, said communication cable being wound around said shaft bushing when said rotary disk rotates, a plug protruding out of said cable outlets being connected on each end of said communication cable,
- a spiral spring received in said receiving tank and hooked in said hook groove of said ring via the outer hook end thereof so as to be wound around said ring when said rotary disk rotates,
- a locking button received in said fixing tank and pushed by a resilient element so that a push part installed thereon protrudes out of said through hole of said housing, a bump being formed on said locking button and extending to the rotation path of said retaining block of said rotary disk,
- whereby said rotary disk will be pushed off by the bevel of said slanting retaining block when said communication cable is pulled out, and said locking button will stop said retaining block to lock said rotary disk when said communication cable is rewound.

5. The improved structure of a wire winding box of claim 4, wherein said shaft bushing of said rotary disk comprises an inner ring and an outer ring spaced by an annular groove, and said slots are formed on said outer ring so that the middle section of said communication cable can be mounted in said slots, positioned in said annular groove, and then wound around said outer ring.

6. The improved structure of a wire winding box of claim 4, wherein a shaft and a pivotal ring are respectively formed at positions on said top cap and said bottom cap of said housing corresponding to said shaft bushing and said ring of said rotary disk so that they can be pivotally installed thereon.

* * * * *